US008523480B2

(12) United States Patent
Laugwitz

(10) Patent No.: US 8,523,480 B2
(45) Date of Patent: Sep. 3, 2013

(54) SOIL COMPACTION DEVICE HAVING A DISCONNECTABLE FUEL LINE

(75) Inventor: Niels Laugwitz, Lahnstein (DE)

(73) Assignee: BOMAG GmbH, Boppard (DE)

( * ) Notice: Subject to any disclaimer, the term of this patent is extended or adjusted under 35 U.S.C. 154(b) by 0 days.

(21) Appl. No.: 13/574,954

(22) PCT Filed: Jan. 25, 2011

(86) PCT No.: PCT/EP2011/000309
§ 371 (c)(1),
(2), (4) Date: Oct. 22, 2012

(87) PCT Pub. No.: WO2011/089020
PCT Pub. Date: Jul. 28, 2011

(65) Prior Publication Data

US 2013/0034388 A1 Feb. 7, 2013

(30) Foreign Application Priority Data

Jan. 25, 2010 (DE) ........................ 10 2010 005 597

(51) Int. Cl.
*E01C 19/30* (2006.01)
*F16K 7/06* (2006.01)

(52) U.S. Cl.
USPC ........................ 404/133.1; 404/133.05; 251/6

(58) Field of Classification Search
USPC ..................... 404/133.05, 133.1; 138/45, 46; 251/6
See application file for complete search history.

(56) References Cited

U.S. PATENT DOCUMENTS 4,895,340 A 1/1990 Forberg
5,190,079 A * 3/1993 Nakada .......................... 138/45
5,720,250 A 2/1998 Greppmair et al.
6,129,330 A * 10/2000 Guala .............................. 251/6
(Continued)

FOREIGN PATENT DOCUMENTS

DE 31 08 789 A1 9/1982
DE 37 38 965 C1 5/1989
(Continued)

OTHER PUBLICATIONS

The International Bureau of WIPO, English Translation of the International Prelimimary Report on Patentability, International Application No. PCT/EP2011/000309, mailed Nov. 15, 2012 (7 pages).

(Continued)

*Primary Examiner* — Gary Hartmann
(74) *Attorney, Agent, or Firm* — Wood, Herron & Evans, LLP

(57) ABSTRACT

The present invention relates to a soil compaction device, in particular such as a tamper or a vibration plate device, having an internal combustion engine and a tank container for receiving fuel for the operation of said internal combustion engine. According to the present invention, there is at least one clamping device on the soil compaction device which has a mechanical effect on an elastically flexible section of a fuel line arranged between the tank container and the internal combustion engine in order to be able to disconnect the fuel flow, wherein the clamping device is mechanically coupled to a manually actuated gas actuation apparatus and/or start-stop apparatus for the internal combustion engine, or integrated therein, wherein at least one roll or roller is arranged on the extension which has an effect on the elastically flexible section of the fuel line in order to disconnect the fuel flow.

12 Claims, 4 Drawing Sheets

(56) References Cited

U.S. PATENT DOCUMENTS

| | | | | |
|---|---|---|---|---|
| 6,419,420 | B2 * | 7/2002 | Hedlund | 404/133.1 |
| 6,929,236 | B1 * | 8/2005 | Height et al. | 251/6 |
| 7,810,784 | B2 * | 10/2010 | Abe et al. | 251/6 |
| 2011/0164924 | A1 * | 7/2011 | Bingham et al. | 404/133.1 |
| 2012/0282027 | A1 * | 11/2012 | Nick et al. | 404/133.1 |

FOREIGN PATENT DOCUMENTS

| | | | |
|---|---|---|---|
| DE | 43 31 198 | A1 | 3/1994 |
| DE | 195 29 826 | C1 | 12/1996 |
| DE | 195 49 113 | C1 | 7/1997 |
| DE | 199 36 959 | A1 | 2/2001 |
| DE | 103 22 007 | B3 | 7/2004 |
| GB | 2 352 797 | A | 2/2001 |

OTHER PUBLICATIONS

ESPACENET, English Translation of DE19549113C1, Published Jul. 31, 1997, retrieved from http://worldwide.espacenet.com on Jul. 23, 2012 (6 pages).

ESPACENET, English Machine Translation of German Patent No. DE 31 08 789 A1, published on Sep. 23, 1982, retrieved from http://worldwide.espacenet.com on Sep. 11, 2012 (4 pages).

ESPACENET, English Machine Translation of German Patent No. DE 37 38 965 C1, published on May 24, 1989, retrieved from http://worldwide.espacenet.com on Sep. 11, 2012 (5 pages).

ESPACENET, English Machine Translation of German Patent No. DE 43 31 198 Al, published on Mar. 17, 1994, retrieved from http://worldwide.espacenet.com on Sep. 11, 2012 (6 pages).

ESPACENET, English Machine Translation of German Patent No. DE 195 29 826 C1, published on Dec. 12, 1996, retrieved from http://worldwide.espacenet.com on Sep. 11, 2012 (7 pages).

ESPACENET, English Machine Translation of German Patent No. DE 195 49 113 C1, published on Jul. 31, 1997, retrieved from http://worldwide.espacenet.com on Sep. 11, 2012 (6 pages).

ESPACENET, English Machine Translation of German Patent No. DE 199 36 959 A1, published on Feb. 15, 2001, retrieved from http://worldwide.espacenet.com on Sep. 17, 2012 (5 pages).

ESPACENET, English Machine Translation of German Patent No. DE 103 22 007 B3, published on Jul. 15, 2004, retrieved from http://worldwide.espacenet.com on Sep. 11, 2012 (5 pages).

German Patent Office, Search Report, Application No. 10 2010 005 597.2 dated Jan. 25, 2010 (4 pages).

European Patent Office, International Search Report, International Application No. PCT/EP2011/000309, mailed Aug. 16, 2012 (2 pages).

* cited by examiner a.)

b.)

SOIL COMPACTION DEVICE HAVING A DISCONNECTABLE FUEL LINE

CROSS-REFERENCE TO RELATED APPLICATIONS

This application is a submission under 35 U.S.C. §371 of International Application No. PCT/EP2011/000309, filed Jan. 25, 2011, which claims priority to German Application No. 10 2010 005 597.2, filed Jan. 25, 2010, the disclosures of which are hereby expressly incorporated by reference herein in their entireties.

FIELD OF THE INVENTION

The present invention relates to a soil compaction device with an internal combustion engine and a tank container for receiving fuel for the operation of the internal combustion engine. The soil compaction device preferably is a hand-operated soil compaction device such as a tamper, a vibration plate device or the like.

BACKGROUND OF THE INVENTION

During transport or prolonged storage of such a soil compaction device, fuel from the tank container can reach the internal combustion engine, which is undesirable. Especially susceptible are internal combustion engines with a diaphragm carburetor device, since fuel will be aspirated by the diaphragm carburetor device during vibrations and will be conveyed into the internal combustion engine. It is therefore known to provide a so-called shut-off valve (gasoline shut-off), with which a fuel flow from the tank container to the internal combustion engine or its carburetor device can be interrupted. Such fuel shut-off valves are frequently not used in practice. The combination of a manually actuated gas actuation device for controlling the speed or power of the internal combustion engine with a fuel valve is known from the state of the art (cf. DE 195 49 113 C1). The valve will be automatically opened and closed by actuating the gas actuation device. Such solutions are susceptible to malfunctions, however, which has a disadvantageous effect on the operational reliability.

SUMMARY OF THE INVENTION

It is therefore an object of the present invention to provide a soil compaction device with which a high level of operational reliability can be ensured.

The soil compaction device according to one embodiment of the present invention comprises an internal combustion engine and a tank container for receiving fuel such as gasoline for the operation of the internal combustion engine. The soil compaction device further comprises a manually actuated gas actuation device and/or a manually actuated start-stop device for the internal combustion engine. Furthermore, the soil compaction device in accordance with one embodiment of the present invention comprises at least one clamping device which mechanically (i.e., without any electrical actuating components) acts on at least one elastically flexible section of a fuel line which is arranged between the tank container and the internal combustion engine or the tank container and a carburetor device belonging to the internal combustion engine and which connects the same, this being in order to interrupt the fuel flow or through-flow through the fuel line and to especially disconnect the flow. It is provided that the clamping device is mechanically coupled with or integrated in the gas actuation device and/or the start-stop device.

The clamping occurs when the flexible section of the fuel line is compressed or squeezed by application of a force (clamping force) at a position provided for this purpose for interrupting the fuel flow. After removing the force, the compressed region of the fuel line will expand again as a result of elastic restoring forces and will release the fuel flow again. Whereas the valve devices known from the prior art are highly sensitive to shocks, vibrations and gumming (which leads to leakages, for example), the solution in accordance with the principles of the present invention is advantageously characterized in that it is robust in numerous ways. Furthermore, an undesirable fuel flow can reliably be interrupted, so that the operational reliability of the soil compaction device is increased considerably. Furthermore, a valve device as known from the prior art as described above can be omitted, so that costs can be saved. The proposed solution is convincingly simple which requires only few components and is extremely robust.

A clamping device shall be understood as being a single one or a plurality of cooperating elements or components which are able to produce a clamping of the fuel line in the region of the elastically flexible section. According to one embodiment, the clamping comprises at least one movable clamping element exerting the clamping force, mechanically acting either directly or indirectly on the elastically flexible section of the fuel line and being capable of producing the clamping, and at least one element constituting the counter-force, which is especially arranged in a rigid and immobile manner. The flexibly elastic section of the fuel line in which the clamping occurs is arranged at least in sections between the effective areas of the corresponding elements.

The flexible section preferably comprises a hose section which is made of a fuel-resistant and weatherproof material. In the case of aging or material fatigue, the respective section can be exchanged rapidly and easily even by untrained staff on site, e.g., at the construction site. This also contributes to an increased operational reliability of the soil compaction device.

According to the present invention, the clamping device is mechanically coupled with a manually actuated gas actuation device for setting the power or the speed of the internal combustion engine and/or with a manually actuated start-stop device providing a start-stop function of the internal combustion engine, or is integrated in said devices. A gas actuation device and a start-stop device can be arranged as one common or combined device. It is preferably provided that the gas actuation device and/or the start-stop device has at least one operating position or starting position in which the internal combustion engine is in operation or can be started, with the fuel flow from the tank container to the internal combustion engine being released, and at least one stop position in which the internal combustion engine is in the deactivated idle state and the fuel flow from the tank container to the internal combustion engine is interrupted. It is provided that, when the internal combustion engine is switched off, the fuel flow to the internal combustion engine is automatically and mechanically (i.e., especially without any electrical actuating components) interrupted by means of the clamping device by manually moving the gas actuation device and/or the start-stop device from the operating position or starting position to the stop position.

According to one embodiment of the present invention, the gas actuation device and/or the start-stop device comprises a pivotable actuating lever (gas lever and/or on-off lever) or the like which can be manually actuated by the operator and which is able to mechanically act on the elastically flexible section of the fuel line via a lever in order to disconnect the fuel flow through the fuel line. The lever mechanism is simply formed by an extension of the actuating lever protruding beyond the pivot joint. Preferably, the actuating lever is integrally arranged with the extension. The extension can act either directly or indirectly on the elastically flexible section of the fuel line in order to produce the clamping. It is provided that, for the indirect clamping, at least one roll or roller is arranged on the extension, which roll or roller acts on the elastically flexible section of the fuel line in order to enable disconnecting the fuel flow through the fuel line. Excessive frictional and thrust forces on the outside jacket of the fuel line can be avoided by using a roll or a roller, which forces could lead to wear and tear and to damage. The roll or the roller is therefore used as a wear-reducing element.

According to one embodiment of the present invention, the actuating lever is provided with at least one cam which is able to mechanically act in a direct or indirect manner on the elastically flexible section of the fuel line in order to interrupt the fuel flow through the fuel line. Preferably, the actuating lever is integrally arranged with the cam. It is provided that at least one pressure element is comprised which is movable relative to the elastically flexible section of the fuel line, that a clamping force applied by the cam is transmitted in a friction-free manner onto the elastically flexible section of the fuel line in order to thereby disconnect the fuel flow through the fuel line. A direct frictional contact between the cam and the elastically flexible section of the fuel line is prevented by means of such a force-transmitting element. The force-transmitting element is therefore also used as a wear-reducing element. This will be described below in closer detail in connection with the drawings.

According to one embodiment of the present invention, the clamping device is arranged in order to enable a point-like clamping of the elastically flexible section of the fuel line. Alternatively, and/or additionally, the clamping device is arranged to enable clamping of the elastically flexible section of the fuel line along a length section or flat clamping. It is similarly preferably provided that the clamping device is arranged to enable multiple clamping, e.g., at different places of the elastically flexible section of the fuel line.

According to one embodiment of the present invention, the clamping device is arranged to clamp and subsequently release at least one elastically flexible section of a fuel line arranged between the tank container and the internal combustion engine, and simultaneously at least one vent line. Such a vent line is connected to an air port and/or vent hole of the tank container. The escape of fuel during the deactivated internal combustion engine, e.g., during the transport of the soil compaction device, can thus effectively be prevented, while the required venting of the tank container in operation remains ensured. The simultaneous closing of the vent line also prevents the escape of hazardous fuel vapors. More than two lines can be disconnected according to the same principle.

According to one embodiment of the present invention, the clamping device, especially including all relevant components, is arranged on a frame construction such as especially a handle device (hand grip) of the soil compaction device. Preferably, the fuel line (especially the elastically flexible section) is arranged at least in sections on the frame construction.

BRIEF DESCRIPTION OF THE DRAWINGS

The present invention will be described below in a non-limiting way by reference to preferred embodiments shown in the drawings, wherein.

DETAILED DESCRIPTION

The embodiments are shown and described in connection with a gas actuation device. Instead of such a gas actuation device, it is also possible to provide in an analogous fashion a start-stop device or a combined device (gas actuation function and start-stop function), as described above.

Figure 1:
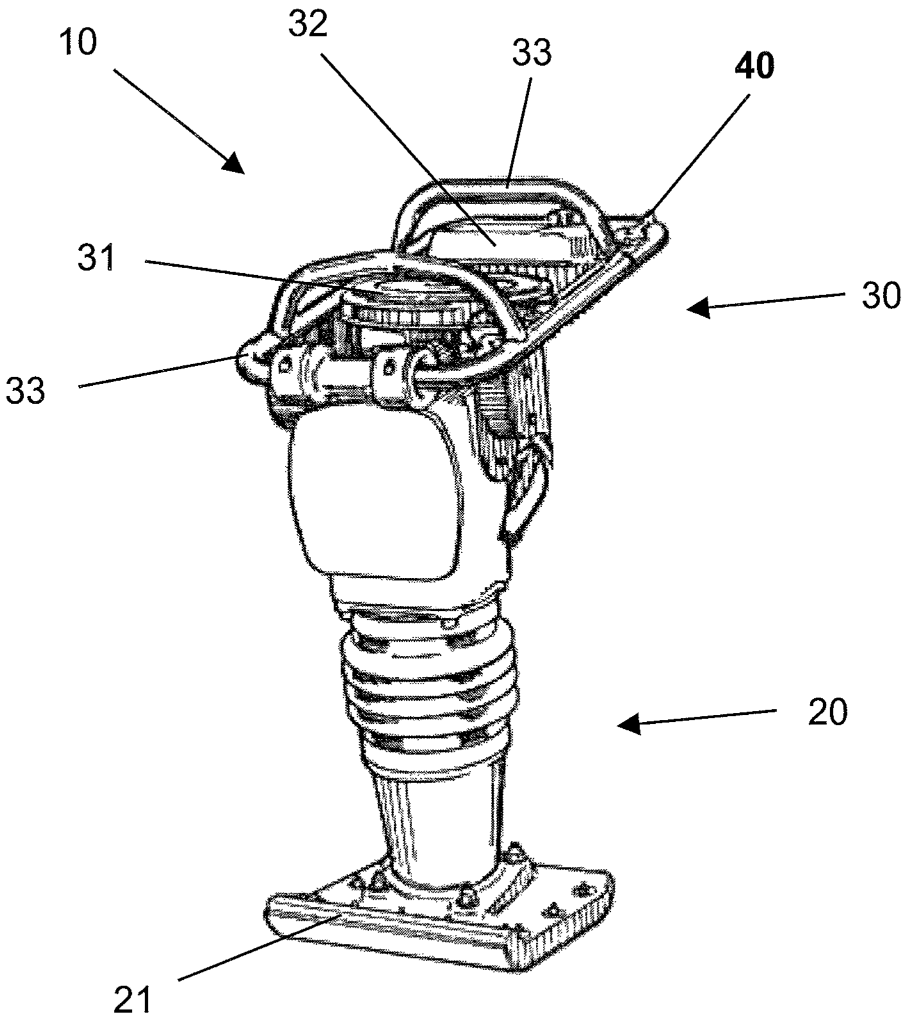
FIG. 1 shows a soil compaction device in a perspective view.

FIG. 1 shows a soil compaction device 10 known from the prior art and is arranged as a tamper. The soil compaction device 10 comprises a lower structure 20 with a tamping plate 21 and an upper structure 30. The upper structure 30 comprises an internal combustion engine 31 for driving the tamping plate 21 and a tank container 32 for receiving fuel for the operation of the internal combustion engine 31. The upper structure 30 also includes a protective frame construction 33 which is simultaneously used as a handle device or a handgrip for a user. A gas actuation device 40, which can be manually actuated, is attached to the frame construction 33 for setting the speed of power of the internal combustion engine 31. The gas actuation device 40 is coupled in accordance with the present invention with a clamping device for interrupting the fuel flow from the tank container 32 to the internal combustion engine 31, as will be described below.

Figure 2:
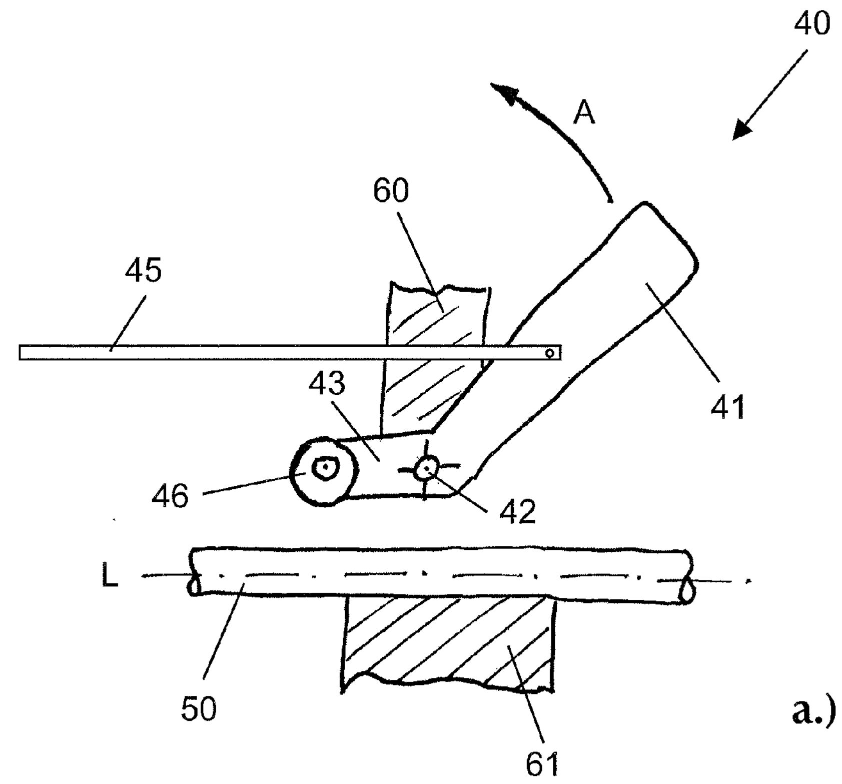
FIGS. 2*a* and 2*b* show a first embodiment of a clamping device in two schematic views.
Figure 2:
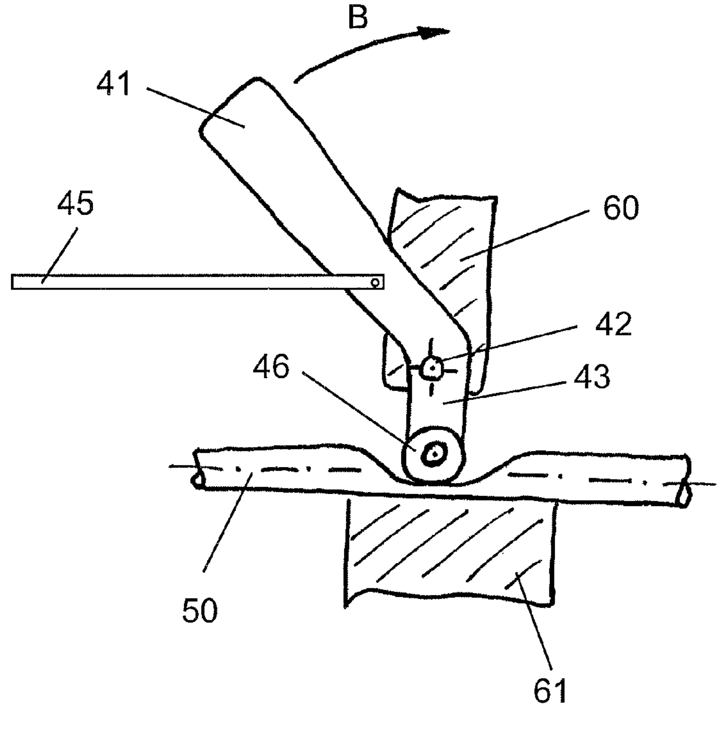

FIG. 2 schematically shows such a gas actuation device 40 with an actuating lever or gas lever 41 which can manually be brought to different positions. FIG. 2*a* shows the actuating lever 41 in an operating position and FIG. 2*b* shows the same actuating lever 41 in a stop position. An idle position (not shown) can be provided between these positions. The actuating lever 41 is pivotably mounted on a fixing device 60 by means of a pivot joint 42. The position of the actuating lever 41 is transmitted by means of a rod assembly or a Bowden cable 45 to a carburetor device of the internal combustion engine 31, by means of which the speed and/or the power of the internal combustion engine 31 can be set as required.

Furthermore, the internal combustion engine 31 can also be switched off or deactivated by means of the actuating lever 41. For this purpose, the actuating lever 41 is moved from the operating position as shown in FIG. 2*a* to the stop position as shown in FIG. 2*b*, which is indicated with the movement arrow A. In this process, a section of the fuel line which is designated with reference numeral 50 and which connects the tank container 32 with internal combustion and 31 is pressed against a rigid clamping jaw 61 and is compressed or squeezed in this process, by means of which the fuel flow from the tank container 32 to the internal combustion engine 31 is effectively interrupted or disconnected. It can be prevented in this process that fuel will continue to reach the engine or its carburetor device in the deactivated state, which is undesirable.

The clamping of the section 50 of the fuel line occurs by means of a clamping device. For this purpose, the actuating lever 41 is provided with an extension 43 which protrudes beyond the pivot joint 42 and is bent off in this example, and on the axial end of which a rotatable roller 46 is arranged. When the actuating lever 41 is moved to the stop position (arrow A), the section 50 of the fuel line is compressed in a kinematic fashion by means of the roller 46. The roller 46 prevents excessive frictional and/or thrust forces as a result of the relative movement between the extension 43 of the actuating lever 41 and the outside jacket of the section 50 of the fuel line.

When the actuating lever 41 is moved from the stop position (FIG. 2*b*) to an operating position, which is indicated with the movement arrow B, the clamping of the section 50 will be removed. As a result of the relief of forces, the compressed region of the fuel line will expand as a result of elastic restoring forces and will release the fuel flow again, whereupon the internal combustion engine can be started and operated again. It is, therefore, necessary that at least the section 50 of the fuel line in which the clamping occurs is made of an elastically flexible material.

Figure 3:
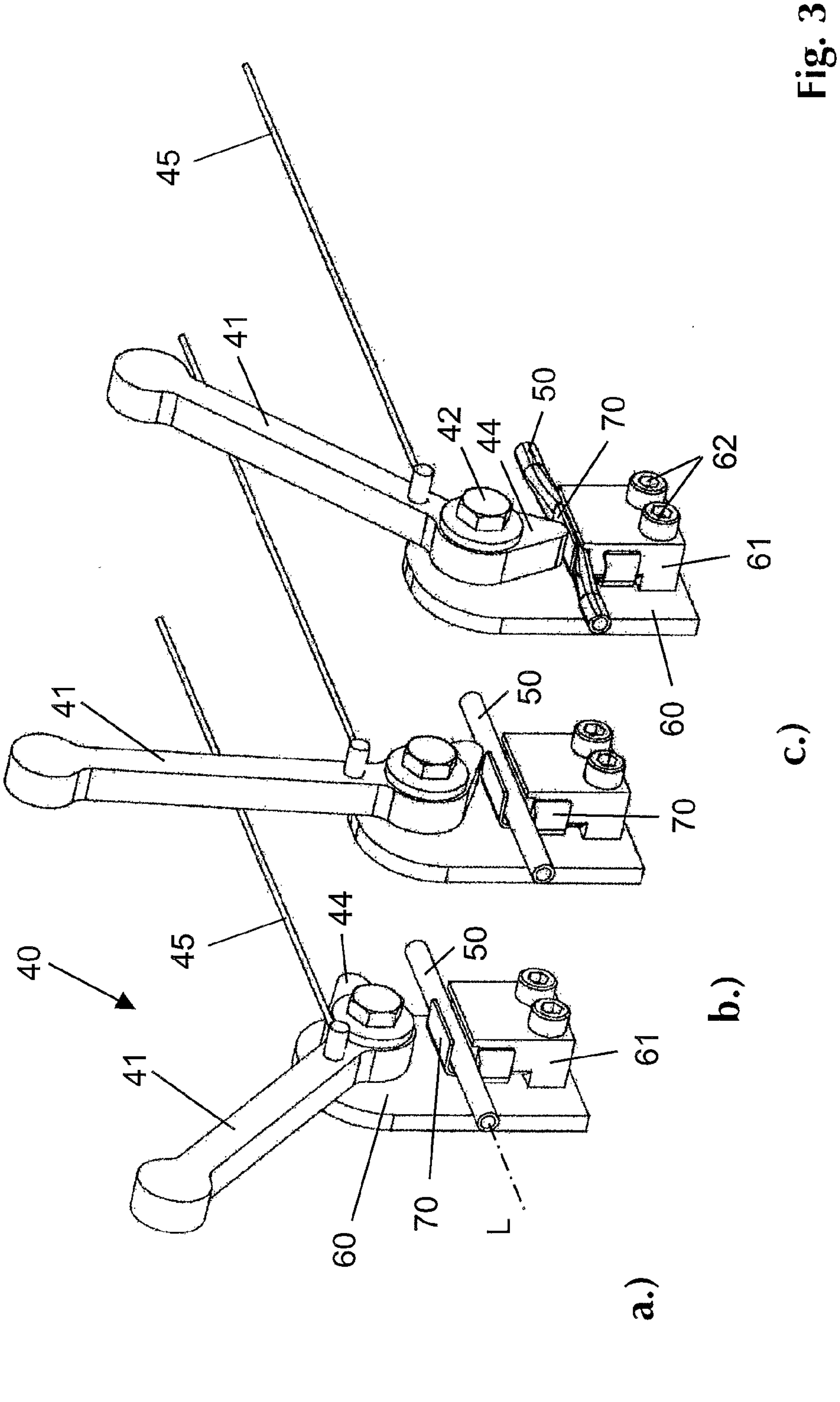
FIGS. 3*a*-3*c* show a second embodiment of a clamping device in several perspective views.

FIG. 3 shows another embodiment of the present invention. The same components and/or components with the same function are designated with the same reference numerals. The illustrations show the same actuating lever 41 in a first operating position (FIG. 3*a*), in a second operating position or idle or start position (FIG. 3*b*), and in a stop position (FIG. 3*c*). Only the relevant differences compared to the first embodiment of FIG. 2, will be described below.

Deviating from the first embodiment of FIG. 2, the actuating lever 41 is provided with an eccentric cam 44 which in the stop position (FIG. 3*c*) presses the flexibly elastic section 50 of the fuel line against the rigid clamping jaw 61 by means of a movable pressure element or clamping element 70, by means of which the fuel flow through the fuel line is disconnected. The movable pressure element 70 transmits the clamping force applied by the cam 44 and simultaneously absorbs the frictional and/or thrust forces resulting from the relative movement. The movable pressure element 70 further allows planar clamping, by means of which the fuel flow can be interrupted in a very reliable way. The pressure element which is arranged as a simple shaped sheet metal part and which is movably mounted is guided on the clamping jaw 61 in a loss-proof manner and is able to move transversely to the longitudinal extension direction L of the section 50 of the fuel line. The restoring movement after the relief of forces will be produced by the elastic restoring forces of the section 50 of the fuel line. The rigid clamping jaw 61 is fixed by means of screws 62 to the fixing device 60, so that the entire gas actuating device 40 can be mounted as a unit together with the clamping device in that the fixing device 60 is fixed to the frame construction 33, for example.

Figure 4:
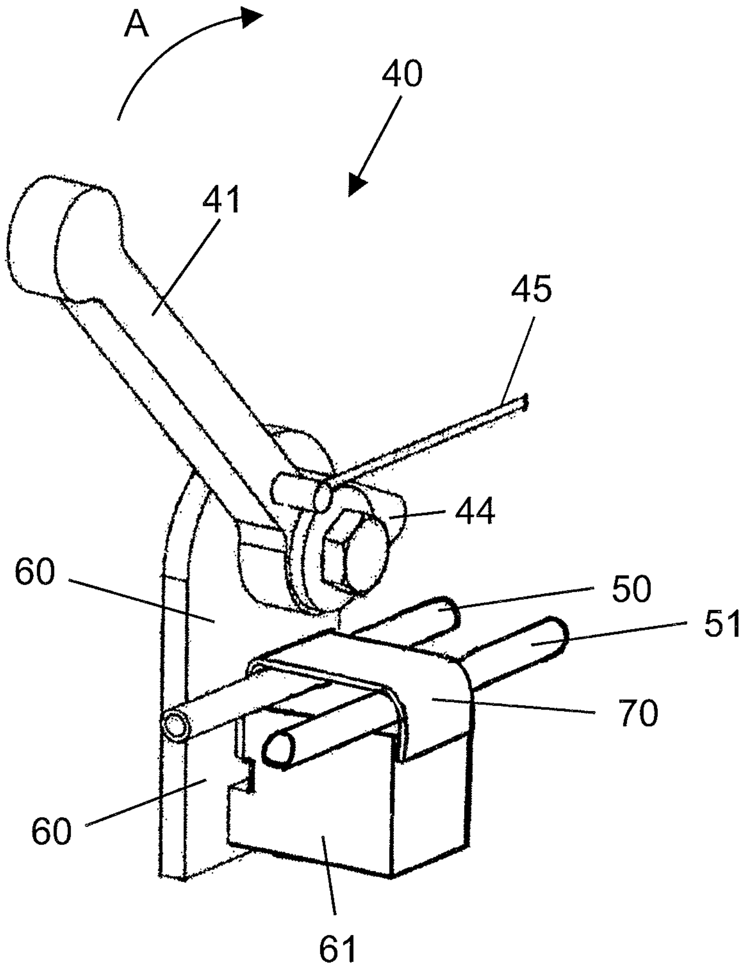
FIG. 4 shows a third embodiment of a clamping device in a perspective view.

FIG. 4 shows a further embodiment of the present invention. The same components and/or components with the same function are designated with the same reference numerals. The illustration shows the actuating lever 41 in a first operating position which corresponds to the operating position as shown in FIG. 3*a*. Only the relevant differences compared to the second embodiment of FIG. 3, will be described below.

Deviating from the second embodiment of FIG. 3, two line sections 50 and 51 are arranged between the movable pressure element 70 and the clamping jaw 61. The section 50 concerns a section of the fuel line which connects the tank container 32 with the internal combustion engine 31, as already described above. The section 51 concerns the section of a vent line which is used for venting and/or airing the tank container 32. Both line sections 50 and 51 are simultaneously clamped by means of the cam 44 and the movable clamping element 70 when the actuating lever 41 is moved from the illustrated operating position in the direction A to a stop position. This can also help effectively prevent the undesirable escape of fuel and/or fuel vapors through the tank venting system, for example.

The features of the previously described embodiments can be combined with one another as long as they are not technically contradicting. Furthermore, a previously described clamping device can also be arranged as a single measure, i.e., without the mechanical coupling with a gas actuating device.

While the present invention has been illustrated by description of various embodiments and while those embodiments have been described in considerable detail, it is not the intention of applicant to restrict or in any way limit the scope of the appended claims to such details. Additional advantages and modifications will readily appear to those skilled in the art. The invention in its broader aspects is therefore not limited to the specific details and illustrative examples shown and described. Accordingly, departures may be made from such details without departing from the spirit or scope of Applicant's invention.

What is claimed is:

1. A soil compaction device, comprising:

an internal combustion engine, a tank container for receiving fuel for the operation of said internal combustion engine, and a manually actuated gas actuation device and/or a start-stop device for the internal combustion engine, including at least one clamping device arranged to mechanically act on an elastically flexible section of a fuel line which connects the tank container with the internal combustion engine in order to interrupt the fuel flow through said fuel line, with said clamping device being mechanically coupled with or integrated in the gas actuation device and/or the start-stop device, and at least one roll or roller being arranged on said gas actuation device and/or the start-stop device, said roll or roller being arranged to act upon the elastically flexible section of the fuel line in order to disconnect the fuel flow.

2. A soil compaction device according to claim 1, wherein the gas actuation device and/or the start-stop device comprises a pivotable actuating lever which can be manually actuated and which acts on the elastically flexible section of the fuel line via a lever mechanism in order to enable the disconnection of the fuel flow.

3. A soil compaction device according to claim 2, wherein the actuating lever is arranged with an extension protruding beyond its pivot joint, with said extension acting directly or indirectly on the elastically flexible section of the fuel line in order to enable the disconnection of the fuel flow.

4. A soil compaction device according to claim 2, wherein the actuating lever is arranged with a cam which acts directly or indirectly on the elastically flexible section of the fuel line in order to enable the disconnection of the fuel flow.

5. A soil compaction device according to claim 4, further comprising a pressure element which is movable relative to the elastically flexible section of the fuel line such that a clamping force applied by the cam is transmitted in a friction-free manner onto the elastically flexible section of the fuel line in order to thereby enable the disconnection of the fuel flow.

6. A soil compaction device according to claim 1, wherein the clamping device is arranged to enable a point-like clamping of the elastically flexible section of the fuel line.

7. A soil compaction device according to claim 1, wherein the clamping device is arranged to enable a planar clamping of the elastically flexible section of the fuel line.

8. A soil compaction device according to claim 1, wherein the clamping device is arranged to enable multiple clamping of the elastically flexible section of the fuel line.

9. A soil compaction device according to claim 1, wherein the clamping device is arranged to enable the clamping of an elastically flexible section of a fuel line arranged between the tank container and the internal combustion engine and simultaneously an elastically flexible section of a vent line of the tank container.

10. A soil compaction device according to claim 1, wherein the clamping device is arranged on a frame construction of said soil compaction device.

11. A soil compaction device according to claim 1, wherein said soil compaction device comprises a hand-operated soil compaction device.

12. A soil compaction device according to claim 10, wherein said clamping device is arranged on a handle device of said soil compaction device.

* * * * *